C. F. GERLINGER.
LUBRICATOR FOR CAR WHEELS.
APPLICATION FILED JAN. 7, 1911.
997,446.
Patented July 11, 1911.
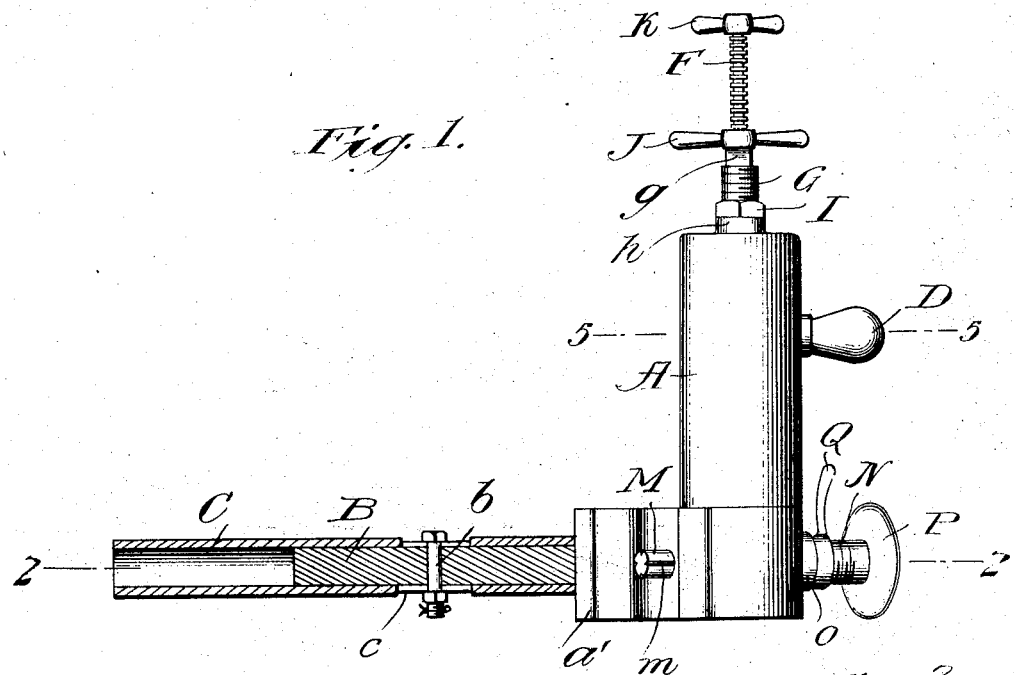
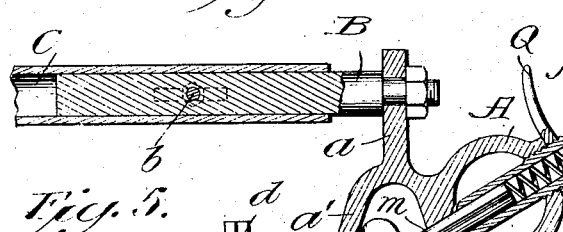
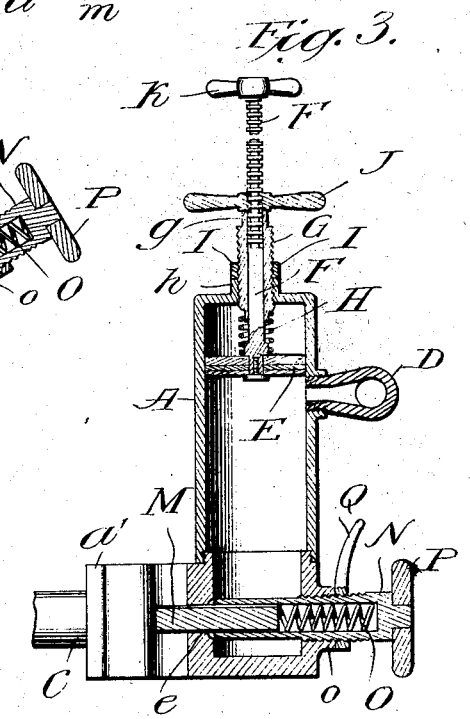
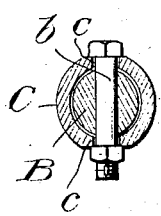
WITNESSES
INVENTOR
Carl F. Gerlinger
By his Attorneys,

UNITED STATES PATENT OFFICE.

CARL F. GERLINGER, OF DALLAS, OREGON.

LUBRICATOR FOR CAR-WHEELS.

997,446.  Specification of Letters Patent.  Patented July 11, 1911.

Application filed January 7, 1911. Serial No. 601,410.

*To all whom it may concern:*

Be it known that I, CARL F. GERLINGER, a citizen of the United States, residing in Dallas, in the county of Polk and State of Oregon, have invented certain new and useful Improvements in Lubricators for Car-Wheels, of which the following is a specification.

My invention relates to that class of lubricators for car wheels in which provision is made for applying oil, grease, or other suitable lubricant to the flanges of the wheels.

It is well known that where the flanges of car wheels are properly lubricated the wheels are prevented from leaving the track when rounding short curves, and the object of my invention is to provide an improved lubricator for this purpose.

In the accompanying drawings, Figure 1 shows a bottom plan view partly in section of a lubricator embodying my improvements. Fig. 2 shows a section thereof on the line 2—2 of Fig. 1. Fig. 3 shows a horizontal section of the lubricator. Fig. 4 is a detail view in section showing the manner of adjustably connecting the lubricator with its support. Fig. 5 shows a section on the line 5—5 of Fig. 1.

The reservoir A for the oil, grease, or other lubricant, is provided with an arm $a$ connected with a rod B that extends into a tubular support C that may be connected with the car truck. The rod B is adjustable in the tube C but its movement is limited by means of a bolt $b$ which extends through the rod B and through slots $c$ formed in the tube C. A flange $a'$ is formed integrally with the arm $a$ and the reservoir A and is adapted to extend over the flange of the wheel X as indicated in Fig. 2. By adjusting the rod B in the tube C the flange $a'$ may be moved toward and from the flange of the car wheel. The reservoir A may be filled through a lubricant receiver D closed by a screw-plug $d$. Within the reservoir A is a piston E attached to a rod F that extends through a screw-plug G that engages a threaded opening in the boss $h$ formed on the reservoir A. The screw-plug G is formed with a squared end $g$ to which a suitable tool may be applied to turn it and thus move it inward or outward relatively to the interior of the reservoir. A spring H is interposed between the piston E and the inner end of the plug G and tends to move the piston toward the delivery opening $e$ thereof. A lock nut I is carried by the screw-plug and prevents the latter from turning when once adjusted to the proper position. The outer end of the rod F is threaded, as shown, and carries a nut J and this rod is provided at its outer end with a handle K. When the nut J is in the position shown in Figs. 1 and 3, bearing upon the end of the plug G, inward movement of the piston E is prevented, but when the nut J is moved toward the handle K a further inward movement of the piston E is permitted and this movement will be effected by the spring H. By adjusting the nut J properly on the threaded portion of the rod F the inward movement of the piston E may be regulated with great nicety.

In the exit port $e$ of the reservoir A is arranged a rod M provided with grooves $m$ and this rod is adapted to bear on the flange of the wheel X, as indicated in Fig. 2. The rod is adapted to move back and forth through the opening $e$ and its inner portion enters a hollow screw-plug N. A spring O within the screw-plug bears upon the inner end of the rod M and presses it toward the flange of the wheel X. The inner end of the plug N is shaped to form a valve for opening and closing the exit port $e$ and this plug is threaded, as shown, and engages corresponding threads in a boss $o$ formed on the reservoir. By means of a handle P on the plug the opening at the exit port $e$ may be opened or closed and regulated. A lock-nut Q serves to hold the plug firmly in place when once adjusted.

By the devices shown and described the feed of the lubricant may be very nicely regulated and the flanges of the wheels may be kept lubricated without waste of the lubricant.

I claim as my invention:

1. A car wheel lubricator, comprising a reservoir for the lubricator, a flange connected therewith and adapted to engage the flange of the car wheel, an arm connected with the reservoir, means for adjustably connecting this arm with a support, a valve for regulating the flow of lubricant from the reservoir, a rod connected with the valve and adapted to press against the flange of the car wheel for leading the lubricant to the flange, and a spring-pressed piston for forcing the lubricant from the reservoir.

2. A car wheel lubricator, comprising a reservoir having an exit opening, a grooved rod moving in said exit opening, a hollow screw plug adjustable in the wall of the reservoir into which the grooved rod projects and a spring within the plug pressing against the inner end of said rod.

3. A car wheel lubricator, comprising a reservoir having an exit opening, a grooved rod moving in said exit opening, a hollow screw plug adjustable in the wall of said reservoir into which the rod projects, a spring within the plug pressing against the inner end of said rod, and a spring-pressed piston for forcing the lubricant toward the plug in a direction transverse to that in which said plug and the grooved rod move.

4. A car-wheel lubricator, comprising a reservoir having an exit opening, a grooved rod extending through this opening, a hollow screw-plug into which the rod projects, a spring within the plug bearing against the rod, and a valve on the inner end of the plug for opening and closing the exit opening.

In testimony whereof, I have hereunto subscribed my name.

CARL F. GERLINGER.

Witnesses:
 CLAIRE PADRICK,
 OSCAR HAYTER.